Patented Oct. 22, 1929

1,732,922

UNITED STATES PATENT OFFICE

GEORGE S. BRATTON, OF ST. LOUIS, MISSOURI, ASSIGNOR TO ANHEUSER-BUSCH, INCORPORATED, OF ST. LOUIS, MISSOURI, A CORPORATION OF MISSOURI

PROCESS FOR MANUFACTURE OF YEAST

No Drawing.   Application filed April 15, 1927.   Serial No. 184,185.

This invention relates to processes of the kind that are used for manufacturing yeast.

The conventional process for manufacturing yeast contemplates the use of a yeast nutrient solution formed from sacchariferous materials. The sacchariferous materials generally used are molasses and cereal worts, and as the nitrogen content of such materials is insufficient to furnish enough yeast assimilable nitrogen to secure a high yield of yeast, it is the usual custom to add inorganic ammonium salts to the sacchariferous materials so as to supply additional yeast assimilable nitrogen. Such compounds or mixtures are not entirely satisfactory, however, in that by-products of a deleterious character are produced in connection with the assimilation of the nitrogen, thereby necessitating considerable control work in practising or carrying out the process and involving a certain element of uncertainty in the event proper control is not maintained.

I have discovered a new class of materials or compounds for incorporating additional nitrogen in yeast nutrient solutions that are easily assimilated and which are of such a nature that they do not give rise to any deleterious by-products, do not disturb the stability of the nutrient solution and do not require any special control during the period of assimilation. The class of materials or compounds above referred to are hereinafter termed ureides of the reducing sugars and they can be produced or formed by causing urea to react under certain known conditions with sugars that contain a carbonyl radical or what are commonly known as reducing sugars, such as, for instance, glucose and maltose, a typical example of which is gluco-ureide, which has the molecular formula $C_7H_{14}O_6N_2$.

I am aware of the fact that urea itself has previously been known to contain yeast assimilable nitrogen, but the nitrogen in urea is not as easily and as completely assimilated by yeast as the nitrogen contained in ureides of the reducing sugars and consequently, is not as efficient as ureides of the reducing sugars for incorporating additional nitrogen in a yeast nutrient solution of relatively low nitrogen content. Comparative experiments with urea and a ureide of the reducing sugars, run under carefully controlled conditions, showed complete assimilation of the nitrogen from ureides of the reducing sugars, while approximately only one-half of the nitrogen from the urea was assimilated under similar conditions.

The quantity of ureides of the reducing sugars necessary for supplying the yeast assimilable nitrogen deficiency of any given quantity of yeast nutrient solution, such, for example, as a solution prepared from beet molasses or cereals, varies, depending not only upon the composition of the materials in question, but also upon the quantity and the desired nitrogen content of the yeast produced by the process. Under present day practice for growing high yields of yeast where the fermentable sugar forms by far the largest portion of the yeast food, the ratio of the total available yeast fermentable sugar to the total available yeast assimilable nitrogen is approximately 25 to 1. This ratio, of course, is varied up or down, depending upon conditions. However, using this ratio as a basis for calculation, the following example is given to illustrate the component parts of the yeast nutrient solution that can be used in practising my process:

| Materials used | Parts (total) | Parts of sugar | Parts of yeast assim. nitrogen |
|---|---|---|---|
| Beet molasses | 85 | 42.5 | 0.50 |
| Mono-ammonium phosphate | 2 | 0.0 | 0.24 |
| Gluco-ureide | 10 | 7.5 | 1.26 |
| Total | 97 | 50.0 | 2.00 |

The percentage of sugar and yeast assimilable nitrogen of the beet molasses in the example above given is assumed, and in actual practice, would have to be determined by analysis.

In practising my process the materials used to form the yeast nutrient solution may be prepared in the usual manner by diluting, sterilizing and clarifying, it, of course, being understood that other sacchariferous materials than beet molasses may be used, and that other sources of nutrient salts may be used. Propagation of yeast may be initiated in the yeast nutrient solution by any manner known to those skilled in the art, such, for example, as by inoculating the solution with seed yeast and aerating said solution. The time of introducing any of the said materials into the propagating solution may be varied. For example, the ureide of the reducing sugars may be introduced into the preparatory solution prior to the inoculation of the yeast, or it may be added during the period of yeast propagation, as required by the yeast. In other words, the presence of the total quantity of materials to be used in a given batch for propagating yeast is not required in the initial solution with which the process is started.

Having thus described my invention, what I claim as new and desire to secure by Letters Patent is:

1. A process for manufacturing yeast, characterized by propagating yeast in a yeast nutrient solution containing a ureide of the reducing sugars.

2. A process for manufacturing yeast, characterized by propagating yeast in a yeast nutrient solution containing yeast assimilable sacchariferous material, yeast nutrient salts, and a ureide of the reducing sugars.

3. A process for manufacturing yeast, characterized by propagating yeast in a yeast nutrient solution, and adding a ureide of the reducing sugars to the solution during the propagating period.

4. A process for manufacturing yeast, characterized by propagating yeast in a yeast nutrient solution containing gluco-ureide.

5. A process for manufacturing yeast, characterized by propagating yeast in a yeast nutrient solution comprising beet molasses, a yeast assimilable phosphate and a ureide of the reducing sugars.

6. A process for manufacturing yeast, characterized by propagating yeast in a yeast nutrient solution comprising beet molasses of insufficient yeast assimilable nitrogen content for a high yield of yeast, a yeast assimilable phosphate, and a ureide of the reducing sugars, the said ingredients being present in such ratios as to supply nourishment sufficient for a high yield of yeast.

GEORGE S. BRATTON.